L. T. MORGAN.
BEET TOPPING DEVICE.
APPLICATION FILED SEPT. 17, 1915.
1,196,967.
Patented Sept. 5, 1916.
2 SHEETS—SHEET 1.
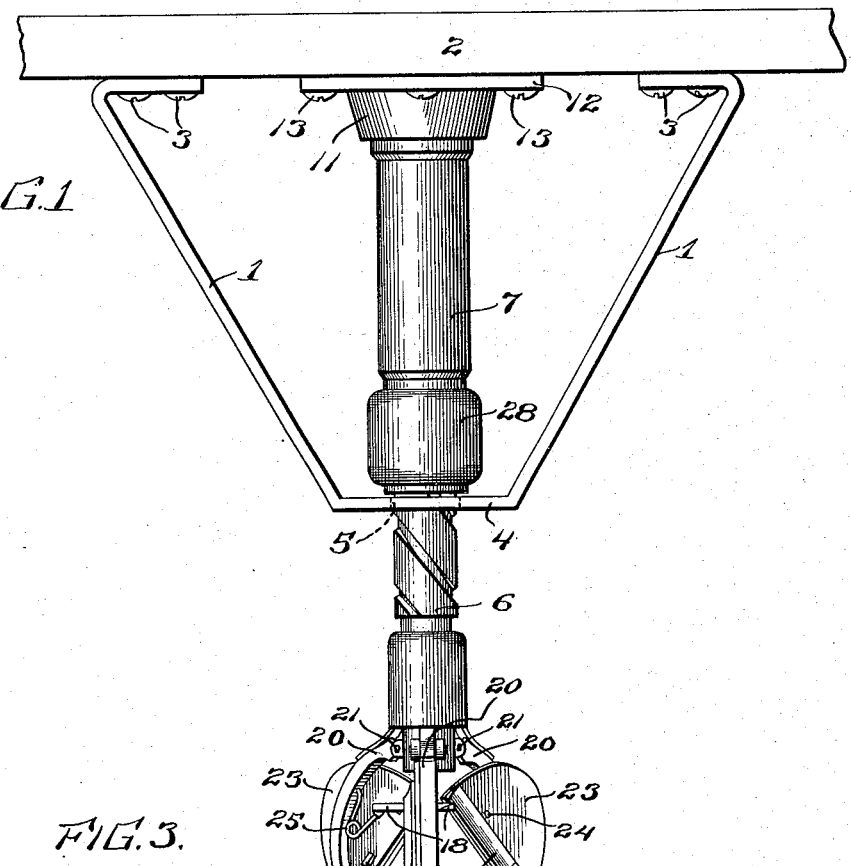
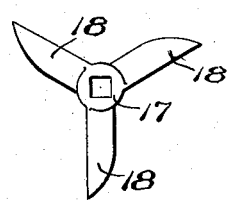
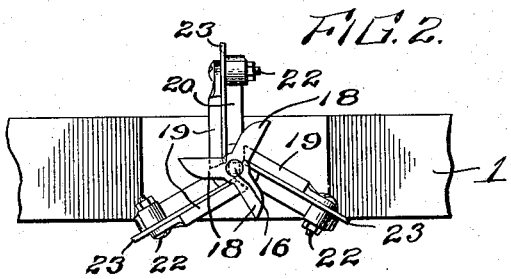
Inventor
L. T. Morgan.
Witness
By
Attorneys

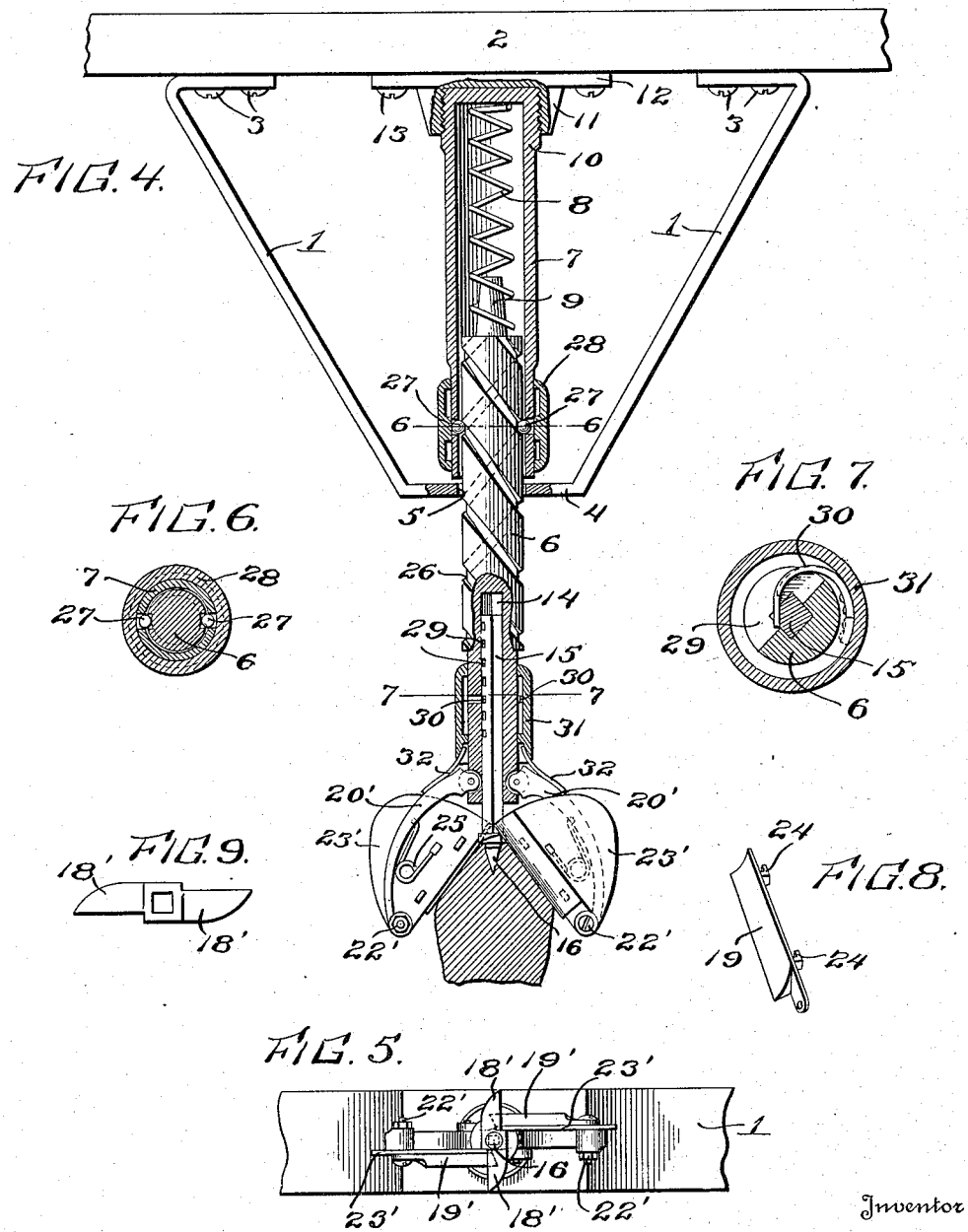

UNITED STATES PATENT OFFICE.

LEWIS T. MORGAN, OF HELENA, MONTANA, ASSIGNOR TO THE KEYSTONE COMPANY, OF HELENA, MONTANA, A CORPORATION.

BEET-TOPPING DEVICE.

1,196,967. Specification of Letters Patent. Patented Sept. 5, 1916.

Application filed September 17, 1915. Serial No. 51,235.

*To all whom it may concern:*

Be it known that I, LEWIS T. MORGAN, a citizen of the United States, residing at Helena, in the county of Lewis and Clark and State of Montana, have invented certain new and useful Improvements in Beet-Topping Devices, of which the following is a specification.

This invention has for its object to provide a beet topping device of simple and cheap construction, yet efficient in carrying out its intended use; and the invention consists primarily in providing means for centering the beet on the device and means for severing the top of the beet, and means coacting with the top severing means for trimming the crest of the beet.

While in its broadest aspect the invention contemplates an arrangement whereby relative rotation may be imparted to the above stated means for carrying out the severing and trimming operation, a further feature consists in so constructing the crest trimming means that it may be angularly adjusted and positioned to be encountered by the beet to determine its angular adjustment by the act of presenting the beet for topping.

A further feature consists in constructing the centering and the top severing means in such a manner that they may be readily adjusted relatively to the crest trimming means.

Further objects relate to the embodiment of the invention in a structure that is readily operated, and to this end, further features consist in providing a device which will automatically adjust itself to the shape of the beet to be topped.

The invention will be more fully understood upon reference to the accompanying drawing, in which:—

Figure 1 is a top plan view of the device illustrating the preferred form of the severing and trimming means; Fig. 2 is a bottom plan view of the preferred form of the severing and trimming means; Fig. 3 is a plan view of the preferred form of the top severing knife; Fig. 4 is a plan view of the device partly in section and illustrating a modified form of the severing and trimming means; Fig. 5 is a bottom plan view of the modified form of the severing and trimming means; Fig. 6 is a cross section on line 6—6 of Fig. 4; Fig. 7 is a cross section on the line 7—7, Fig. 1; Fig. 8 is a perspective view of one of the crest trimming knives; Fig. 9 is a plan view of the modified form of the top severing knife.

Referring to the drawings in detail, the device will first be described with reference to Figs. 1 to 3 inclusive, which represent the preferred form of the device, and in which form, 1 represents a bracket which is adapted to be securely fixed on support 2 by the screw 3, or some other convenient means. The bracket 1 is provided with a horizontal portion 4 having an opening 5 therein which provides a bearing for the reciprocating spindle 6. This spindle is mounted in a suitable housing 7, and in which it is adapted to be reciprocated against the tension of a spiral spring 8, (see Fig. 4) which is disposed within the housing and secured on the spindle by a suitable stud 9. The housing 7 is secured to the support 2 by its threaded head 10 screw-threaded into the threaded flange 11 of a base 12, which base is fixed on the support by its screws 13. With the housing thus supported on the base 12, its free end is adapted to abut against the horizontal strip 4 of the bracket 1, and surround the opening 5 therein. The end of the spindle 6 is hollowed out to provide an axial opening 14 in which the stem 15 of the beet centering member 16 is housed. This stem also carries the beet topping knife 17, which, in the preferred form (see Figs. 1 to 3 inclusive) comprises a crown or cross knife consisting of a multiple of blades 18 radiating from a common center, and having cutting edges facing in the direction of rotation. Mounted on the end of the spindle 6 are a multiple of knives 19 having concave faces which coact with the crown or topping knife for trimming the crest of the beet, and by means of their convex sides playing against the beet permit the knife to sever any low growing leaves without injuring the beet. These knives 19 embody in their structure, angularly adjustable arms 20, pivoted on the spindle 6 at 21 and constructed to carry the knives 19 on their free ends by means of the pivotal mounting 22. 23 represents a multiple of wings which are also pivoted on the arms 20 and against which the knives 19 are held by means of the lugs 24 (see Fig. 8) engaging suitable recesses in the face of the wings. These wings are adapted to cover the space between the knives on the arms 20, and are used to sweep the parings of the beet clear from the cutting knives. When in their normal position, the knives 19 are adapted to rest against their respective blades 18, of the crown knife 17, and at right angles thereto; and in order that they may be normally held in such a position, springs 25 are carried by the wings 23 and adapted to exert upward tension on the arms 20. It is to be noted in the construction of the crest trimming means that the knives 19 are ahead of their respective wings 23, and that the wings are ahead of the arms which carry them. With the topping and crest trimming means thus constructed, and in order to impart rotation to the spindle 6 which carries them, the spindle is constructed with spiral grooves 26 (see Fig. 4), in which balls 27, mounted in the housing 7, are seated and adapted to impart the necessary rotation to this spindle when the same is reciprocated. The balls 27 are retained in the housing 7 by the collar 28.

The operation of the device is as follows: The beet to be topped is centered on the centering means 16 and by the act of presenting the beet to the device, the crest trimming knives are adjusted to conform with its shape, and by exerting further or harder pressure on the beet after it has been centered, the spindle will be caused to reciprocate and rotate; and by the rotation of the spindle, the topping or crown knife 17 and the crest trimming knives 19 will be also caused to rotate, and the topping of the beet accomplished. As above stated, the cutting edges on the crown or topping knife face in the direction of rotation. In some instances, it would be desirable that the centering means be adjustable relative to the crest trimming means. To this end, the stem 15 is adapted to be slid in the axial opening 14, and in order that its vertical position may be readily controlled, it is constructed with a plurality of recesses 29, in which an elastic finger 30, carried on the inside of the grip sleeve 31, is adapted to be seated. The finger may be unseated to permit vertical adjustment of the stem 15 by the grip sleeve 31, which in turn, is loosely mounted on the spindle 6. In making an adjustment of the stem 15, the sleeve is gripped and rotated, probably 90° when the finger will be unseated, and the stem released for adjustment. Referring further to the arms 21, it is to be noted that springs 32 are provided to retain the arms in their normal position under tension.

While the detail construction and the operation of the preferred form of the device have been explained, it can be further said with respect to the modified form of the device, in which form the details of construction are similar to the preferred form, with the exception of the crown or topping knife and the crest trimming knives, that in the modified form, the crown or crest trimming knife comprises a cross knife having a pair of cutting blades 18' radiating from a common center, and having cutting edges facing in the direction of rotation, and the crest trimming means comprises only a pair of arms 20', which arms carry a pair of crest trimming knives 19', and a pair of wings 23'. The crest trimming knives 19' in this form overlie the crown or top severing knife, they being pivoted to the arms 20' as at 22'. The operation of the modified form of the device is similar to that described with regard to the preferred form of the device.

I claim:—

1. A beet topping device, comprising axially disposed means for centering the beet on the device, means associated with the centering means for severing the top of the beet, and means coacting with the top-severing means for trimming the crest of the beet.

2. A beet topping device, comprising axially disposed means for centering the beet on the device, means for imparting rotation to the centering means, means carried by the centering means for severing the top of the beet, and means coacting with the top-severing means for trimming the crest of the beet.

3. A beet topping device, comprising axially disposed means for centering the beet on the device, means for imparting rotation to the centering means, means carried by the centering means for severing the top of the beet, and means coacting with the top-severing means for trimming the crest of the beet; said means for imparting rotation to the centering means being also adapted to impart rotation to the crest-trimming means.

4. A beet topping device, comprising means for centering the beet on the device, means associated with the centering means for severing the top of the beet, means coacting with the top-severing means for trimming the crest of the beet; and means for adjusting the position of the centering means relative to the crest-trimming means.

5. A beet topping device, comprising means for centering the beet on the device, means for imparting rotation to the centering means, means carried by the centering means for severing the top of the beet, means coacting with the top-severing means for trimming the crest of the beet; said means for imparting rotation to the centering means being also adapted to impart rotation to the crest-trimming means; and means for adjusting the position of the centering means relative to the crest-trimming means.

6. A beet topping device, comprising means for centering the beet on the device, means associated with the centering means for severing the top of the beet, and means coacting with the top-severing means for trimming the crest of the beet; said crest-trimming means being angularly adjustable relatively to the centering means.

7. A beet topping device, comprising means for centering the beet on the device, means for imparting rotation to the centering means, means carried by the centering means for severing the top of the beet, means coacting with the top-severing means for trimming the crest of the beet; and means for adjusting the position of the centering means relative to the crest-trimming means.

8. A beet topping device, comprising means for centering the beet on the device, means for imparting rotation to the centering means, means carried by the centering means for severing the top of the beet, and means coacting with the top-severing means for trimming the crest of the beet; said means for imparting rotation to the centering means being also adapted to impart rotation to the crest-trimming means, and comprising a slidably mounted spindle on which said centering and top-severing means are mounted.

9. A beet topping device, comprising means for centering the beet on the device, means associated with the centering means for severing the top of the beet, and means coacting with the top-severing means for trimming the crest of the beet; said crest-trimming means being angularly adjustable and positioned to be encountered by the beet to determine its angular adjustment by the act of presenting the beet for topping.

10. A beet topping device, comprising means for centering the beet on the device, means for severing the top of the beet, and means for trimming the crest of the beet; the centering means comprising a slidably mounted stem adapted to carry the top-severing means and adjust said top-severing means relatively to the crest trimming means.

11. A beet topping device, comprising means for centering the beet on the device, means for severing the top of the beet, and means for trimming the crest of the beet; the top-severing means comprising a multiple-edged crown knife carried by said centering means against which the crest-trimming means are adapted to bear.

12. A beet topping device, comprising means for centering the beet on the device, means for severing the top of the beet, and means for trimming the crest of the beet; the crest-trimming means comprising a multiple of angularly adjustable knives positioned to be encountered by the beet to determine their angular adjustment by the act of presenting the beet for topping.

13. A beet topping device, comprising means for centering the beet on the device, means for severing the top of the beet, and means for trimming the crest of the beet; the top-severing means comprising a multiple-edged crown knife carried by said centering means against which the crest-trimming means are adapted to bear; and the crest-trimming means comprsing a multiple of angularly adjustable knives positioned to be encountered by the beet to determine their angular adjustment by the act of presenting the beet for topping.

14. A beet topping device, comprising a reciprocating spindle having a suitable housing, means on the housing for imparting rotation to the spindle during its reciprocation, said spindle having an axial opening in its end, a centering stem slidably mounted in said opening having means for centering the beet to be topped, and a multiple-edged crown knife carried by the centering means for severing the top of the beet, crest-trimming means pivotally mounted on the end of the reciprocating spindle, comprising a multiple of arms pivoted to said spindle, a multiple of trimming knives pivoted to said arms, and adapted to coact with said crown knife, a multiple of springs disposed between the pivoted arms and said trimming knives adapted to retain said trimming knives in contact with said crown-knife; and a multiple of wings carried by said trimming knives adapted to clear the crest of the beet from the device after it has been severed by the trimming knives.

15. A beet topping device, comprising means for centering the beet on the device, means for severing the top of the beet, and means for trimming the crest of the beet; the top severing means comprising a multiple-edged crown knife carried by said centering means against which the crest trimming means are adapted to bear and the crest trimming means comprising a multiple of angularly adjustable knives having concave and convex faces, said convex face adapted to bear against the beet, said knives being positioned to be encountered by the beet to determine their angle of adjustment by the act of presenting the beet for topping.

The foregoing specification signed at Helena, Montana, this thirteenth day of September, 1915.

LEWIS T. MORGAN.